United States Patent
Chen

(10) Patent No.: US 8,090,553 B2
(45) Date of Patent: Jan. 3, 2012

(54) CABLE LENGTH DETECTION APPARATUS AND METHOD FOR A KEYBOARDING VIDEO MOUSE SWITCH

(75) Inventor: Sun-Chung Chen, Taipei (TW)

(73) Assignee: Aten International Co., Ltd., Shijr (TW)

(*) Notice: Subject to any disclaimer, the term of this patent is extended or adjusted under 35 U.S.C. 154(b) by 0 days.

(21) Appl. No.: 12/413,107

(22) Filed: Mar. 27, 2009

(65) Prior Publication Data

US 2009/0187377 A1 Jul. 23, 2009

Related U.S. Application Data

(63) Continuation of application No. 11/038,054, filed on Jan. 21, 2005, now Pat. No. 7,532,998.

(30) Foreign Application Priority Data

Apr. 7, 2004 (TW) .............................. 93109652 A

(51) Int. Cl.
*G01B 7/02* (2006.01)

(52) U.S. Cl. ............................ 702/158; 702/97; 348/691

(58) Field of Classification Search .................. 702/158, 702/159, 97; 375/240, 240.25, 250.01, 240.28, 375/240.29; 348/500, 521, 525, 572, 691
See application file for complete search history.

(56) References Cited

U.S. PATENT DOCUMENTS

| | | | |
|---|---|---|---|
| 4,718,168 A | 1/1988 | Kerr | |
| 5,159,275 A * | 10/1992 | Fujimura | 324/617 |
| 5,714,876 A | 2/1998 | Baker | |
| 5,818,378 A | 10/1998 | Cheng et al. | |
| 6,489,854 B1 | 12/2002 | Chen | |
| 7,221,389 B2 | 5/2007 | Ahern et al. | |
| 2002/0191718 A1 | 12/2002 | Ellis, Sr. | |
| 2003/0147359 A1 | 8/2003 | Chen | |
| 2005/0227517 A1 | 10/2005 | Chen | |

FOREIGN PATENT DOCUMENTS

| | | |
|---|---|---|
| EP | 1646230 A1 | 4/2006 |
| TW | 00303435 | 4/1997 |

OTHER PUBLICATIONS

Avocent AMX Series Installer/User Guide, 2003 (relevant passages: p. 3, video compensation; p. 5, last paragraph).
"Avocent AMIQ Modules AMIQ-PS2, AMIQ-PS210, AMIQ-PS232", http://www.42u.com/amiq-ps2.htm, 1 page, unknown date, printed from the Internet on Mar. 7, 2011.
Chinese Office Action, dated May 16, 2011, in a counterpart Chinese patent application, No. CN 200910158153.8.

* cited by examiner

*Primary Examiner* — Manuel L Barbee
(74) *Attorney, Agent, or Firm* — Chen Yoshimura LLP

(57) ABSTRACT

A cable length detection apparatus is provided to detect the length of a cable having at least three pairs of wires for transmitting video signals. The cable length detection apparatus has a signal compressing circuit, a signal converting circuit and a length calculating circuit. The signal compressing circuit compresses an electrical signal into one pair of wires. The signal converting circuit converts the electrical signal transmitted by the pair of wires into a value. The length calculating circuit then calculates the length of the cable according to the value.

14 Claims, 5 Drawing Sheets

CABLE LENGTH DETECTION APPARATUS AND METHOD FOR A KEYBOARDING VIDEO MOUSE SWITCH

RELATED APPLICATIONS

The present application is based on, and claims priority from, Taiwan Application Serial Number 93109652, filed on Apr. 7, 2004, the disclosure of which is hereby incorporated by reference herein in its entirety.

BACKGROUND

1. Field of Invention

The present invention relates to a cable length detection apparatus. More particularly, the present invention relates to an apparatus for measuring a length of a cable for transmitting an analog signal.

2. Description of Related Art

With the rapid development of information technology, computers and their peripherals have become very popular. Mice and keyboards are often used to control computers. Through the use of monitors or speakers, computer users can monitor the state of their computers.

The monitor usually uses three color signals, such as red, green and blue color signals, to make various other colors. The colors can be generated by combining these three color signals. Because general monitors are analog, the colors of their images are adjusted by controlling voltages such that every pixel can be displayed with continuous levels to represent vivid, photographic images.

In a computer system, video signals are transmitted to a monitor from a video adapter via a cable. However, the video signals are degraded by the impedance matching of the cable. If there is no compensation in the video signals, the images observed on the monitor are blurred. Contrarily, if the video signals are over-compensated, over-excited signals are formed, resulting in a reduction of monitor lifetime.

Moreover, when the length of the cable exceeds ten meters, the video signals are considerably lessened, thus degrading the quality of images and causing an operation error because of the unclear display. Specifically, various types of cables, such as a shielding twisted pair (STP) and a foil twisted pair (FTP), have distinct frequency responses. The video signals therefore exhibit different degradation phenomena when they are transmitted on various cables. The above reasons make it is difficult to use a simple signal compensation device in a fixed way to compensate the signal degradations occurring on cables of different types or different length.

In order to overcome the problems mentioned above, the prior art provides a method that uses a time difference between transmission and return of high-speed streams to calculate the length of cable. However, the conventional method is expensive and hard to perform. Moreover, the prior art provides another method that compresses an electrical signal into a UART line of the cable, and the UART line is typically used to transmit electrical signals for the keyboard or mouse.

However, this conventional method first has to stop the communications of other signals, and then performs the measurement of the length of the cable. For conditions with busy communications, such as continuous keyboard or mouse use, the conventional method substantially reduces communication bandwidth, and causes signal delay.

SUMMARY

It is therefore an objective of the present invention to provide a cable length detection apparatus that is cheap and has simple circuits, and is suitable for operating in coordination with a signal compensation device to compensate signal degradation because of the cable length.

It is another objective of the present invention to provide a cable length detection apparatus configured on a keyboard video mouse (KVM) switch to measure lengths of cables with different types and lengths connected to the KVM switch for performing video signal compensation.

It is still another objective of the present invention to provide a cable length detection method that does not occupy communication bandwidths of other signals, and is simply and easily combined with other compensation methods.

In accordance with the foregoing and other objectives of the present invention, a cable length detection apparatus is provided for measuring a length of a cable for transmitting a video signal; the cable has at least three pairs of wires. The cable length detection apparatus has a signal compressing circuit, a signal converting circuit and a length calculating circuit. The signal compressing circuit compresses an electrical signal into one pair of wires. The signal converting circuit converts the electrical signal transmitted by the pair of wires into a value. The length calculating circuit then calculates the length of the cable according to the value.

In another aspect, the present invention also provides a cable length detection method for measuring a length of a cable for transmitting a video signal. An electrical signal is compressed into one of three color signals of the video signal when a vertical sync signal of the video signal is enabled. The electrical signal transmitted by the cable is converted into a value, and a length of the cable is then calculated according to the value.

According to one preferred embodiment of the present invention, when the vertical sync signal and a horizontal sync signal of the video signal are separately compressed into the two color signals, the electrical signal is compressed into the remaining color signal. The electrical signal is a square wave signal. A frequency range of the electrical signal is between 4 MHz and 12 MHz, and a preferred frequency of the electrical signal is about 8 MHz.

After being compressed into the color signal, the electrical signal is converted into a differential signal for transmission in the cable, and the transmitted differential signal is reconverted into a single-line signal for conversion into the value. During value converting, the electrical signal transmitted by the cable is filtered to a direct current signal. Next, a direct current level of the direct current signal is adjusted, and the adjusted direct current signal is then converted into the value.

Additionally, the above adjusting step provides a reference voltage for comparison with the direct current level of the direct current signal. An output voltage of the direct current signal is adjusted in proportion to a difference between the direct current level of the direct current signal and the reference voltage.

Moreover, the preferred embodiment further decodes the vertical sync signal from the color signal compressed with the vertical sync signal, and calculates the length of the cable when the decoded vertical sync signal is enabled. The three color signals comprises a red color signal, a green color s signal and a blue color signal. According to another preferred embodiment, the three color signals comprise a luminance signal and two chrominance signals.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
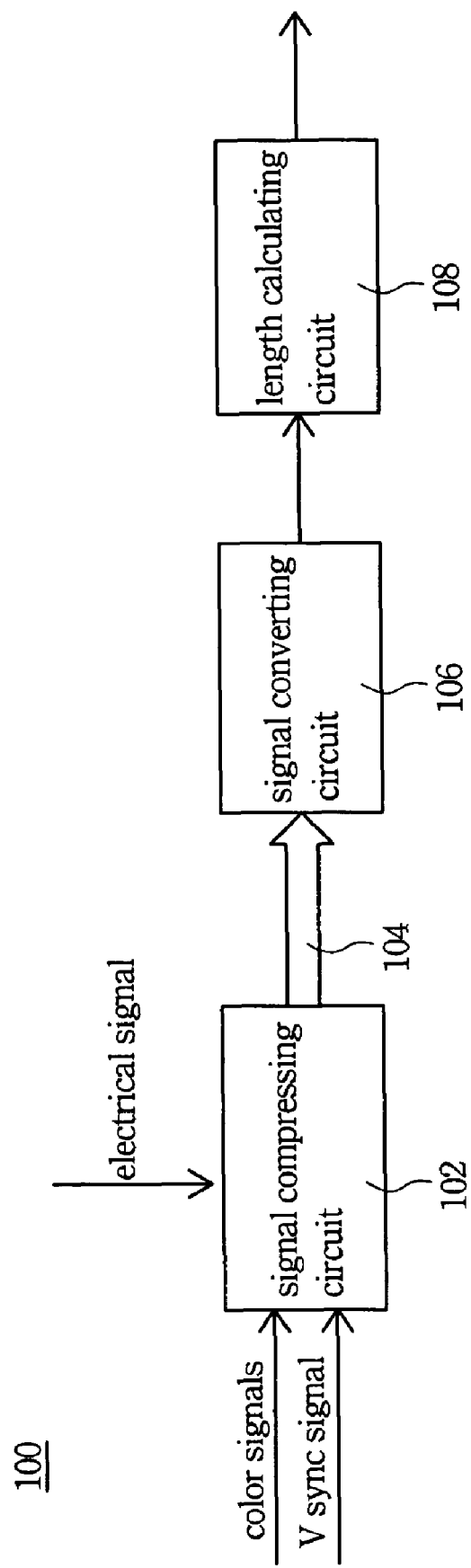
FIG. 1 illustrates a schematic view of one preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a schematic view of one preferred embodiment of the present invention. A cable length detection apparatus 100 is used to measure a length of a cable 104 for transmitting video signals. The cable 104 has at least three pairs of wires, and the three pairs of wires are used to separately transmit three color signals contained in the video signal, such as a red color signal (R), a green color signal (G) and a blue color signal (B), or a luminance signal (Y) and two chrominance signals (U) and (V). In general, in addition to three color signals, the video signal further comprises a horizontal sync signal (H) and a vertical sync signal (V).

The foregoing three color signals are analog signals, and the horizontal and vertical sync signals are digital signals. Analog signals are degraded when they are transmitted over a long distance, thus causing signal deformation and distortion. However, digital signals do not suffer from these problems.

The cable length detection apparatus 100 has a signal compressing circuit 102, a signal converting circuit 106 and a length calculating circuit 108. The video signal is input into the signal compressing circuit 102. When the vertical sync signal of the video signal is enabled, the signal compressing circuit 102 compresses an electrical signal, such as a square wave signal, into a certain color signal. The monitor does not display any video signals when the vertical sync signal is enabled. In other words, when the vertical sync signal is enabled, the additionally compressed electrical signal does not form any images on the display, and therefore does not affect the users.

After being transmitted by the cable 104, the transmitted electrical signal is converted into a value by the signal converting circuit 106, by, for example, using an analog-to-digital converting circuit to perform the conversion of analog signals to digital signals. The length calculating circuit 108 then calculates the length of the cable 104 according to the value, for compensating the signal degradations occurring in the cable 104, which may be of different types or different lengths by subsequent signal compensation devices.

Figure 2:
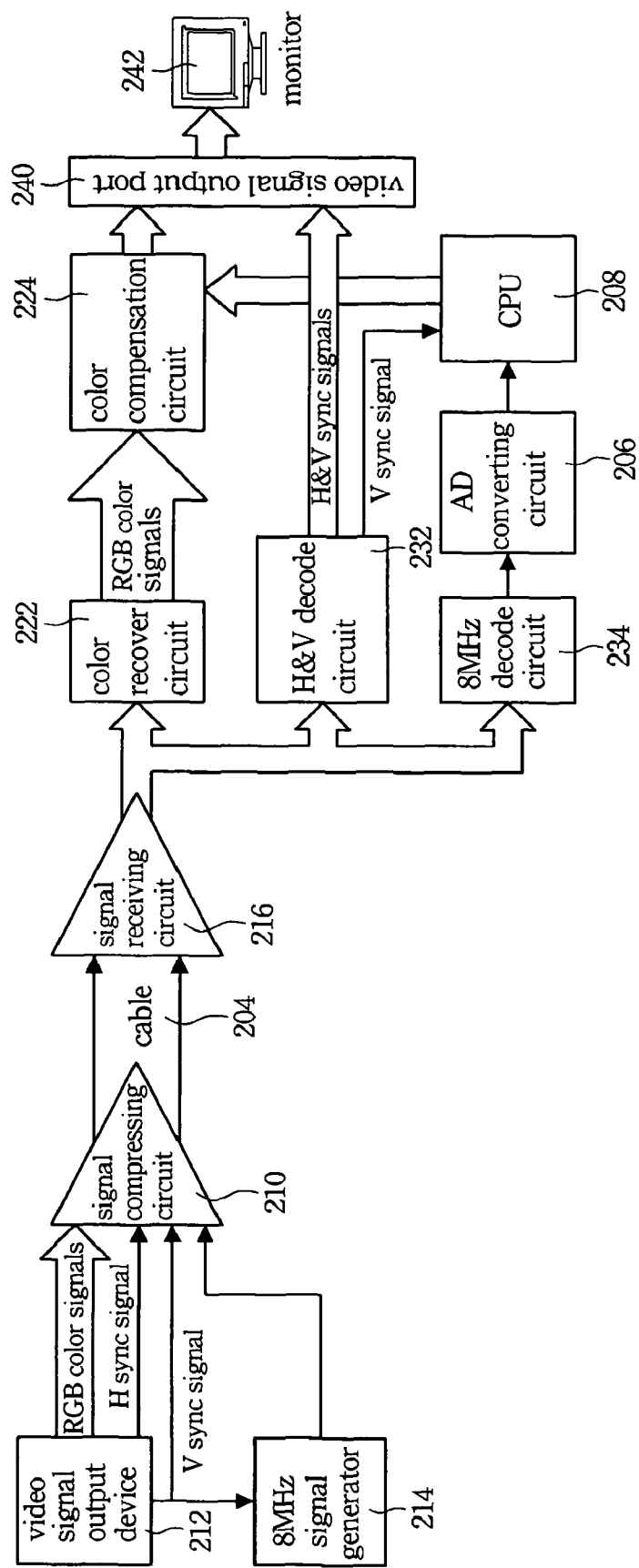
FIG. 2 illustrates a schematic physical view of the preferred embodiment in FIG. 1.

FIG. 2 illustrates a schematic physical view of the preferred embodiment in FIG. 1, and cooperates with FIG. 1 to interpret the preferred embodiment. A video output device 212, such as a video card for computers, outputs video signals to a monitor 242 through a cable 204. The video signal comprises a red color signal (R), a green color signal (G), a blue color signal (B), a horizontal sync signal (H) and a vertical sync signal (V). The cable 204 has three pairs of wires, which are in charge of separately transmitting the red color signal (R), the green color signal (G) and the blue color signal (B). The horizontal sync signal (H) and the vertical sync signal (V) are separately compressed into any two of the three color signals.

In principle, the frequencies of the video signals can be up to 66 MHz. However, the frequencies of most video signals are between 4 MHz and 12 Mhz. The signal degradation of the video signals relate to the frequency response of the cable 204 and the frequencies of the video signals. Therefore, in the preferred embodiment, a square wave signal of 8 MHz is generated by an 8 MHz signal generator 214 for performing the measurement of the cable length of the cable 204.

When the vertical sync signal is enabled, the signal compressing circuit 210 compresses the 8 MHz square wave signal into the color signal without being compressed with the horizontal or vertical sync signal. In other words, when the three color signals are transmitted by the cable, they are separately compressed with the horizontal sync signal, the vertical sync signal and the 8 MHz square wave signal.

However, the preferred embodiment does not limit the ways of matching the three color signals, the horizontal sync signal, the vertical sync signal and the square wave signal when they are compressed. Any matching thereof can be used in the preferred embodiment.

In addition, if the horizontal and vertical sync signals of the video signal are combined together, like the video signal used in SUN system, the horizontal and vertical sync signals need to be separated from each other first and then be compressed separately into the color signals.

The color signals compressed with the digital signals are received by a signal receiving circuit after being transmitted by the cable 204. The color signals compressed with the digital signals are then reconverted by a color recover circuit 222 into three color signals without digital signals. However, after being transmitted by the cable 204, these analog color signals are degraded either greatly or slightly, thus causing the image distortion.

A horizontal and vertical sync signals decode circuit 232 decodes and gets the horizontal sync signal and the vertical sync signal from the color signals compressed with those digital signals, respectively. An 8 MHz signal decode circuit 234 decodes and gets the 8 MHz square wave signal from the color signals compressed with the digital signal. In the preferred embodiment, the horizontal and vertical sync signals decode circuit 232 and the 8 MHz signal decode circuit 234 are three signal decode circuits separately connected to the three pairs of wires for decoding the horizontal sync signal, the vertical sync signal and the square wave signal, respectively.

The 8 MHz square wave signal transmitted by the cable 204 is converted into a value, such as a voltage, by an analog-to-digital (AD) converting circuit 206. Then, a central processing unit (CPU) 208 is used to calculate the length of the cable 204 according the magnitude of the value, and a color compensation circuit is used to compensate the degraded color signals. The horizontal sync signal, the vertical sync signal and the there compensated color signals are then output to the monitor 242 through a video output port 240 for displaying the correct images without signal degradations.

Figure 3:
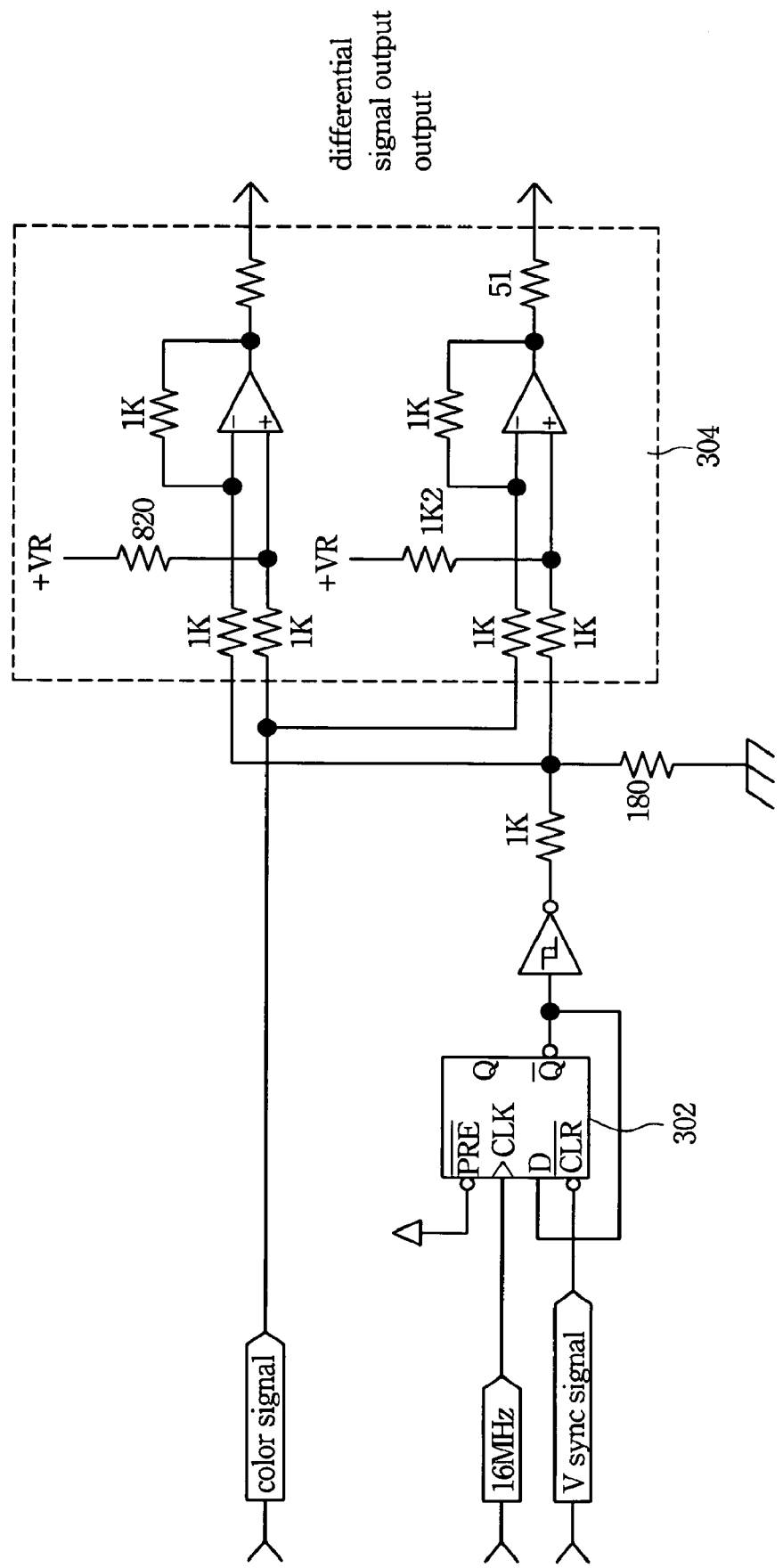
FIG. 3 is a circuit diagram of the 8 MHz signal generator and the signal compressing circuit of the preferred embodiment in FIG. 2.

FIG. 3 is a circuit diagram of the 8 MHz signal generator 214 and the signal compressing circuit 210 of the preferred embodiment in FIG. 2. A frequency divider 302 divides a 16 MHz square wave signal by two, and outputs an 8 MHz square wave signal only when the vertical sync signal is enabled. A differential circuit 304 compresses the 8 MHz square wave signal and the color signal, and converts the compressed signal into a differential signal for transmission by the cable.

Moreover, in the preferred embodiment, the horizontal sync signal and the vertical sync signal are also compressed into another two color signals by using other differential circuits 304. Because the transmission speed of the differential signal is faster, it is a method for transmitting the analog color signals with low signal degradations.

Figure 4:
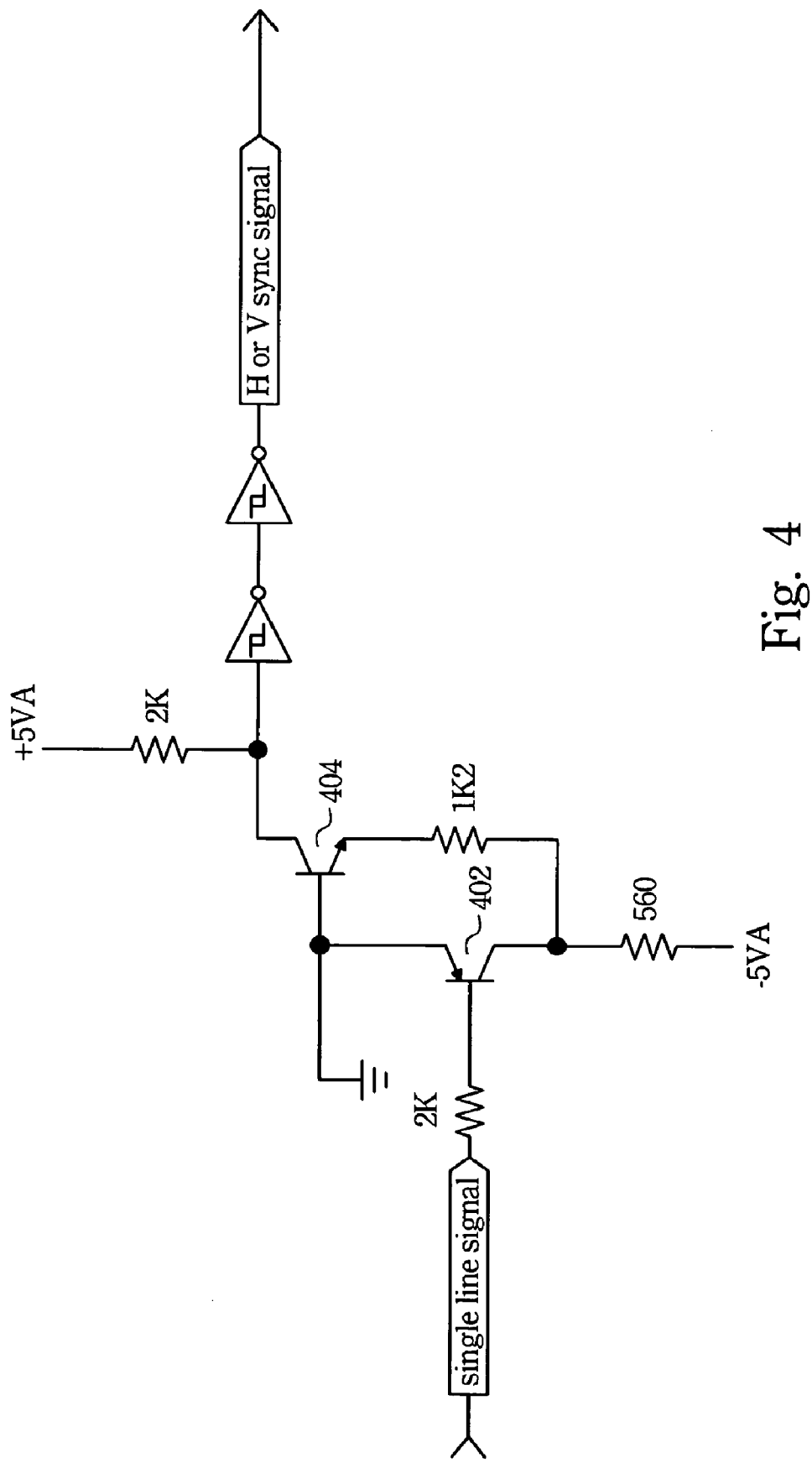
FIG. 4 is a circuit diagram of the horizontal and vertical sync signals decode circuit of the preferred embodiment in FIG. 2.

FIG. 4 is a circuit diagram of the horizontal and vertical sync signals decode circuit 232 of the preferred embodiment in FIG. 2. After being transmitted by the long-distance cable 204, the differential signal is converted back into a common single-line signal. In the single-line signal of the preferred embodiment, the color signal thereof is positive, and the compressed horizontal or vertical sync signal thereof is negative.

When the signal line signal is positive, a transistor 402 is off and a transistor 404 is on, and the output signal of the horizontal and vertical sync signal decode circuit 232 is approximately zero. In other words, the positive color signal cannot be output from the horizontal and vertical sync signals decode circuit 232. In the other hand, when the signal line signal is negative, a transistor 402 is on and a transistor 404 is off, and the output signal of the horizontal and vertical sync signal decode circuit 232 is positive. In other words, the horizontal and vertical sync signals decode circuit 232 decodes the negative parts of the single line signal by using the two transistors 402 and 404, and gets the horizontal or vertical sync signal.

It is noted that each of the horizontal and vertical sync signals is decoded by each horizontal and vertical sync signals decode circuit 232. Moreover, the decoded and output horizontal and vertical sync signals are actually positive. However, the output positive signals opposite the original negative signals do not cause any ill effect in the subsequent signal processing.

Figure 5:
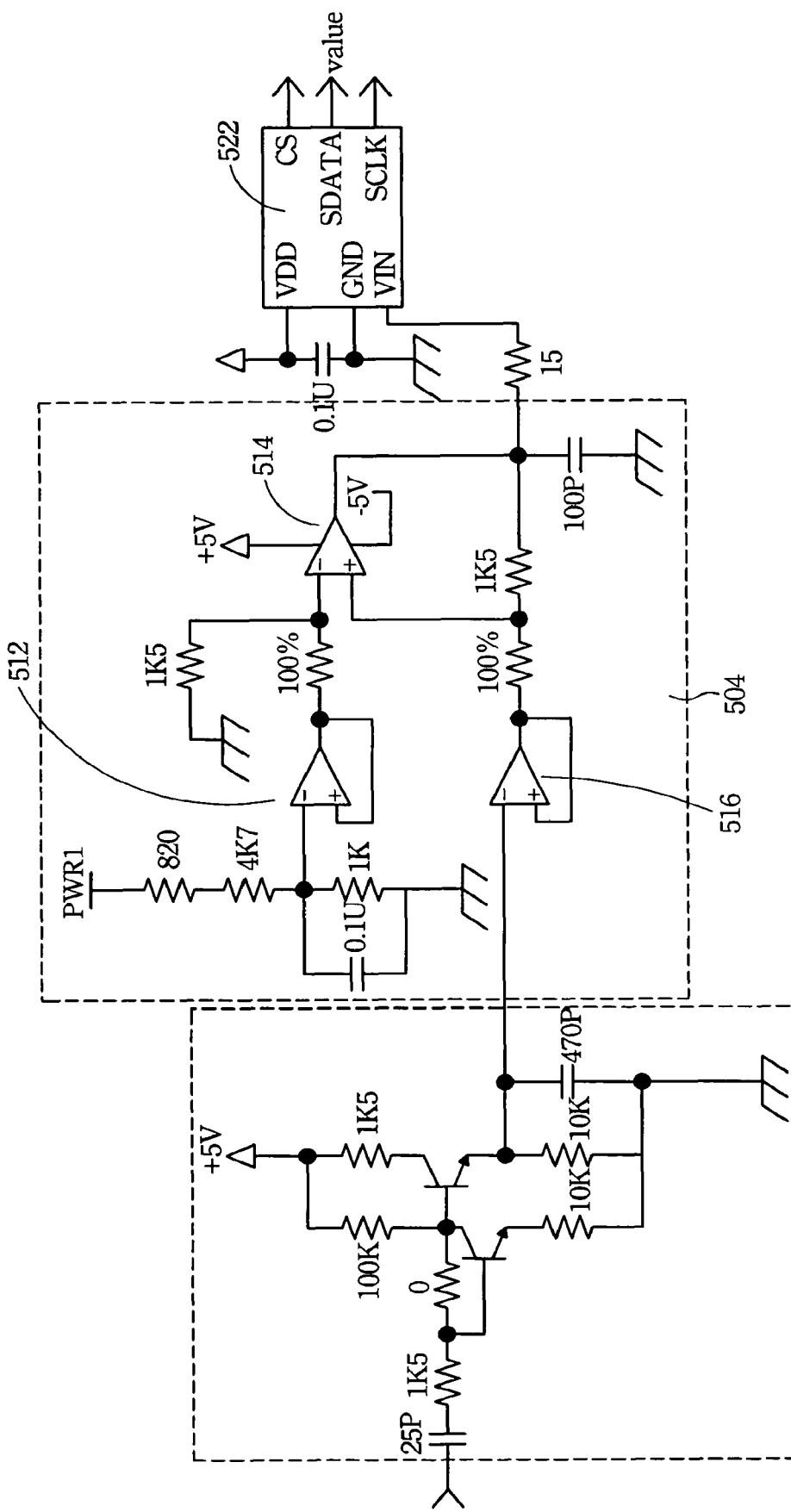
FIG. 5 is a circuit diagram of the 8 MHz signal decode circuit and the analog-to-digital converting circuit of the preferred embodiment in FIG. 2.

FIG. 5 is a circuit diagram of the 8 MHz signal decode circuit 234 and the analog-to-digital converting circuit 206 of the preferred embodiment in FIG. 2. Similarly, after being transmitted by the long-distance cable 204, the differential signal is converted into the single-line signal. The single-line signal is filtered by the filtering circuit 502 to a direct current (DC) signal for being output to a direct current level adjusting circuit 504. If the cable 204 is longer, the signal degradation of the signal transmitted on it is greater, and therefore the direct current of the signal is smaller; on the contrary, if the cable 204 is shorter, the signal degradation of the signal transmitted on it is less, and therefore the direct current of the signal is greater.

The direct current level adjusting circuit 504 comprises an amplifier 512, an amplifier 514 and an amplifier 516. The amplifier 516 is an emitter follower. PWR1 is a reference voltage. The amplifier 512 provides zero adjusting by voltage division. When the difference between the direct current level of the direct current signal and the reference voltage is greater, the output voltage of the direct signal is then raised. When the difference between the direct current level of the direct current signal and the reference voltage is smaller, the output voltage of the direct signal is then decreased. The amplifier 514 is responsible for controlling the amplifier gain such that the voltage output by the amplifier 512 is the greatest when the cable 204 is in a longest scale.

After being converted by the direct current level adjusting circuit 504, the converted direct current signal is input into an analog-to-digital converting circuit, such as an 8-bit analog-to-digital converting circuit 522. The 8-bit analog-to-digital converting circuit 522 converts the voltage of the direct current signal into a value. The value is then input in a length calculating circuit, which is a central processing unit 208 in the preferred embodiment.

Because the square wave signal is effective only when the vertical sync signal is enabled, the vertical sync signal is also input into the central processing unit 208, as illustrated in FIG. 2. The central processing unit 208 performs the calculation of the value only when the vertical sync signal is enabled. The central processing unit 208 according to the value calculates the cable length of the cable 204 by, for example, table look-up. The color compensation circuit 224 then carries out signal compensations, such as amplifying, adjusting and frequency compensation of the color signals, according to the measured cable length of the cable 204.

The preferred embodiment of the present invention compresses the square wave signal in the color signal without compressing any horizontal or vertical sync signal when the vertical sync signal is enabled, and calculates the cable length according to the signal degradation of the square wave signal after being transmitted by the cable. When the vertical sync signal is enabled, the additionally compressed electrical signal does not form any images on the display, and therefore does not affect the users.

Moreover, the preferred embodiment fully utilizes the originally unused bandwidth of the cable, and improves the signal delays and bandwidth decrease due to occupation of the UART line in the prior art. The electrical elements used in the preferred embodiment are simple and cheap, are easily put into practice, and effective and correctly compensate the degraded analog signals by cooperation with a signal compensation device.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A video signal degradation compensation apparatus, for compensating video signal degradation caused by a length of a cable for transmitting a video signal, wherein the cable has at least three pairs of wires for transmitting three color signals, the video signal degradation compensation apparatus comprising:

a signal compressing circuit arranged to compress an electrical signal into one pair of wires only when the color signals of the video signal are not displayed, the electrical signal being different from the vertical sync signal and a horizontal sync signal; and a signal converting and degradation compensation circuit arranged to convert the electrical signal transmitted by the pair of wires into a value representing direct current signal levels of the electrical signal after being transmitted based on a degradation of the electrical signal, and to calculate a compensation amount for compensating video signal degradation caused by the length of the cable, wherein the calculation is performed according to the value without using any other input signals.

2. The apparatus of claim 1, wherein when the vertical sync signal and the horizontal sync signal of the video signal are separately compressed into two pairs of the wires, the signal compressing circuit is arranged to compress the electrical signal into a remaining pair of wires.

3. The apparatus of claim 1, wherein the electrical signal is a square wave signal.

4. The apparatus of claim 1, wherein a frequency range of the electrical signal is between 4 MHz and 12 MHz.

5. The apparatus of claim 1, wherein the signal converting and degradation compensation circuit comprises:
   a filtering circuit arranged to filter the electrical signal transmitted by the pair of wires to a direct current (DC) signal;
   a DC level adjusting circuit arranged to adjust a DC level of the DC signal; and
   an analog-to-digital converting circuit arranged to convert the adjusted DC signal into the value.

6. The apparatus of claim 1, wherein the signal compressing circuit is further arranged to convert the electrical signal into a differential signal.

7. A video signal degradation compensation apparatus, for compensating video signal degradation caused by a length of a cable for transmitting a video signal, wherein the video signal has three color signals, a horizontal sync signal and a vertical sync signal, the cable has at least three pairs of wires for separately transmitting the three color signals, and the horizontal sync signal and the vertical sync signal are separately compressed into two color signals, the video signal degradation compensation apparatus comprising:
   a signal compressing circuit arranged to compress a square wave signal into the remaining color signal without being compressed with the horizontal sync signal or the vertical sync signal when the color signals of the video signal are not displayed, and arranged to convert the color signal compressed with the square wave signal into a differential signal;
   a differential recovering circuit arranged to recover the differential signal transmitted by the pair of wires into a single-line signal; and
   a signal converting and degradation compensation circuit arranged to convert the single-line signal into a value based on a degradation of the square wave signal, and to calculate a compensation amount for compensating video signal degradation caused by the length of the cable, wherein the calculation is performed according to the value.

8. The apparatus of claim 7, further comprising:
   a signal decoding circuit arranged to decode the vertical sync signal from the color signal compressed with the vertical sync signal, wherein the signal converting and degradation compensation circuit is arranged to calculate the compensation amount when the decoded vertical sync signal is enabled.

9. The apparatus of claim 7, wherein a frequency range of the square wave signal is between 4 MHz and 12 MHz.

10. The apparatus of claim 7, wherein the signal converting and degradation compensation circuit comprises:
    a filtering circuit arranged to filter the single-line signal to a DC signal;
    a DC level adjusting circuit arranged to adjust a DC level of the DC signal; and
    an analog-to-digital converting circuit arranged to convert the adjusted DC signal into the value.

11. An apparatus for transmitting a video signal via a cable, wherein the cable has at least three pairs of wires for transmitting three color signals, the apparatus comprising:
    a signal compressing circuit for compressing an electrical signal into one pair of wires only when the color signals of the video signal are not displayed, the electrical signal being different from the vertical sync signal and a horizontal sync signal; and
    a signal processing circuit for converting the electrical signal transmitted by the pair of wires into a value representing direct current signal levels of the electrical signal after being transmitted based on a degradation of the electrical signal, generating a parameter signal according to the value without using any other input signals, and compensating the video signal transmitted by the cable according to the parameter signal.

12. The apparatus of claim 11, wherein the parameter signal is a length of the cable.

13. The apparatus of claim 11, wherein the signal processing circuit amplifies and adjusts the video signal.

14. The apparatus of claim 11, wherein the signal processing circuit carries out frequency compensations of the video signal.

* * * * *